United States Patent
Lopez

(10) Patent No.: US 8,034,278 B2
(45) Date of Patent: Oct. 11, 2011

(54) PRESSURIZED MOLDING OF COMPOSITE PARTS

(75) Inventor: Alfonso Lopez, Freemont, CA (US)

(73) Assignee: Hexcel Corporation, Dublin, CA (US)

(*) Notice: Subject to any disclaimer, the term of this patent is extended or adjusted under 35 U.S.C. 154(b) by 880 days.

(21) Appl. No.: 11/331,511

(22) Filed: Jan. 13, 2006

(65) Prior Publication Data

US 2007/0164479 A1 Jul. 19, 2007

(51) Int. Cl.
*B28B 7/32* (2006.01)
*B29C 43/36* (2006.01)

(52) U.S. Cl. ........ 264/314; 264/313; 264/319; 264/554; 264/DIG. 50; 425/389; 425/405.1; 425/DIG. 19

(58) Field of Classification Search ................... 264/314, 264/553, 554, 316, 552, 313; 425/389, DIG. 14, 425/DIG. 19, DIG. 112; B29C 70/44
See application file for complete search history.

(56) References Cited

U.S. PATENT DOCUMENTS

| | | | | |
|---|---|---|---|---|
| 3,661,683 A | * | 5/1972 | Engel et al. ................ | 156/580 |
| 5,528,828 A | * | 6/1996 | Leahy et al. ............... | 29/889.6 |
| 5,772,950 A | * | 6/1998 | Brustad et al. ............. | 264/510 |
| 5,820,894 A | | 10/1998 | Kreutzer | |
| 6,231,796 B1 | * | 5/2001 | Allen .......................... | 264/72 |
| 6,319,346 B1 | | 11/2001 | Clark | |
| 6,435,242 B1 | * | 8/2002 | Reis et al. ................... | 156/382 |
| 6,537,483 B1 | | 3/2003 | Cartwright | |
| 6,596,121 B1 | | 7/2003 | Reynolds | |
| 6,666,651 B2 | | 12/2003 | Rust | |
| 6,692,681 B1 | | 2/2004 | Lunde | |
| 6,746,737 B2 | | 6/2004 | Debalme | |
| 7,105,122 B2 | * | 9/2006 | Karason ....................... | 264/314 |
| 2002/0031641 A1 | * | 3/2002 | George et al. ............... | 428/105 |
| 2004/0222562 A1 | * | 11/2004 | Kirchner ..................... | 264/314 |

FOREIGN PATENT DOCUMENTS

| | | |
|---|---|---|
| DE | 10150659 A1 | 5/2003 |
| FR | 1301825 | 7/1962 |
| FR | 2673571 | 9/1992 |
| GB | 1181383 | 2/1970 |
| GB | 2065022 A * | 6/1981 |

OTHER PUBLICATIONS

"Fiberset Incorporated's Glossary of Composite Terms", www.fiberset.com/html/glossary/glos_p.html, last updated Sep. 3, 1999.*
Erik Larsen, et al., Investigation of a Two-Stage Injection Process to Reduce the Effects of In-Plane Resin Flow, AIAA-2002-0026, pp. 1-7.

* cited by examiner

*Primary Examiner* — Philip Tucker
*Assistant Examiner* — William Bell
(74) *Attorney, Agent, or Firm* — W. Mark Bielawski; David J. Oldenkamp

(57) ABSTRACT

Apparatus and methods for molding composite bodies into composite parts using pressure. A lower inflexible mold is combined with an elastic upper mold layer to form a molding cavity in which the composite body to be molded is placed. An elastic pressure layer is used in combination with the upper mold layer to form a pressure chamber. A flexible expansion control layer is used to limit the increase in surface area of the pressure layer during pressurization. A perimeter retention lock is provided to prevent the perimeters of the elastic and flexible layers from moving inward or away from the lower mold during application of pressure to the pressure chamber.

17 Claims, 2 Drawing Sheets

PRESSURIZED MOLDING OF COMPOSITE PARTS

BACKGROUND OF THE INVENTION

1. Field of the Invention

The present invention relates generally to systems and methods for molding composite parts. More particularly, the invention is directed to systems and methods that apply pressure to the composite structure during the molding step.

2. Description of Related Art

Composite materials are used extensively in the aerospace and marine industries, the wind energy turbine industry and in other situations where high strength and relatively light weight are desired. Composites typically include fibers and polymer resin as the two principal elements. A wide range of fiber types has been used in composites. Glass, graphite, carbon and ceramic fiber are common. The fibers can be chopped, randomly oriented, unidirectional in orientation or woven into fabric. The fibers used in composite materials have diameters that range from extremely small to relatively large. Although it is possible to make composites using large diameter fibers, the more common practice is to take thousands of fibers having extremely small diameters and form them into individual bundles known as tows. These multi-fiber tows are much stronger and more flexible than single fibers having the same overall diameter. The tows can be woven into fabric in the same manner a conventional yarns. Alternatively, the tows are arranged in parallel to provide a unidirectional fiber orientation or they can be randomly oriented. The ways in which the polymer resin is infused or impregnated into the complex fiber structure and the ways in which the resulting resin/fiber structure is cured are important considerations in the molding of composite parts.

There are a number of ways to combine the polymer resin with the fibers and there are a number of ways to cure or mold the resulting composite body to form the final composite part. One approach, which has been in use for years, is to manually impregnate the fibers with activated resin in-situ on a mold or other support structure. Depending on the particular resin system, heat may or may not then be applied to cure the resulting "lay-up". This type of manual lay-up procedure is popular because it is simple, requires little, if any, special tools and can be used to make large parts, such as boat hulls. However, it is difficult to accurately control the amount of resin that is applied to the fibers and to insure that the resin is being uniformly impregnated into the fiber tows. In addition, the amounts of curing agent and other additives that are added to the resin may vary between lay-ups.

In order to avoid the above problems, it has been common practice to form a prefabricated lay-up (prepreg) that includes the fiber and resin matrix (resin, curing agents and any additives). The prepreg is made under manufacturing conditions that allow the amount and distribution of resin matrix within the prepreg to be carefully controlled. Once formed, the prepreg may be applied to a mold or other support surface in the same manner as a conventional manual lay-up. In general, prepregs are not used immediately after they are formed. Instead, they usually are stored for use at a later time. Another popular way to combine the polymer resin and fibers is to use a vacuum to infuse the polymer resin into the fiber structure. Such vacuum infusion methods typically use a vacuum bag to surround the fiber structure during resin infusion.

There are also a number of ways to cure or mold the combined polymer resin/fiber composite body. A common practice is to heat the composite body while at the same time applying pressure to the body. This is typically accomplished using an autoclave. The use of positive pressure during molding provides many benefits including: reducing voids in the final composite part, providing complete resin infiltration of thick fiber structures, diminishing resin rich areas that are more susceptible to delamination, allowing for the use of high fiber volume fractions, allowing for the use of high viscosity resins and generally improving mechanical properties.

Large and/or thick solid composite parts, such as wind energy turbine blades, ship hulls, bridge decks and similar large-scale components are not practical to process in an autoclave. Due to the size and process limitations, such large scale structures are often manufactured using vacuum infusion methods or vacuum bag only curing for pre-preg lay-ups. Processing large parts using infusion methods does present some problems. For example, it is difficult to control the resin distribution during curing because the vertical sections in large structures may experience "vertical sag". Vertical sag occurs when the uncured resin flows due to gravity during extended-time lay-ups or during the cure cycle when the viscosity of the resin typically decreases. This creates uneven thickness and differences in resin content through the composite structure. Vacuum only processing of prepreg lay-ups can produce better results in terms of resin content homogeneity and a higher fiber volume fraction. However, vacuum-only processing tends to produce large parts that have higher void content due to air entrapment between prepreg layers. Less than 2% void content in composite parts having 55% fiber volume is possible with vacuum bag-only processing. However, the large scale laminates made using vacuum-only processing still exhibit higher void content than structures made using an autoclave or other system that applies positive pressure, in addition to atmospheric pressure, during the curing step.

There are a number of systems that are designed to provide an alternative to the conventional autoclave for applying positive pressure and heat to a composite structure during cure. Such systems employ a variety of solid and flexible mold components to provide application of positive pressure and heat to the composite structure during curing. One example is referred to as the "Quickstep" process where the composite material is paced in a mold and sealed with a flexible sheet or matched mold. The tooling and part are then place inside a sealed tank with heat transfer fluid. The heat transfer fluid is used to apply and pressure to the composite material during curing.

Another example of a pressure application system is described in U.S. Pat. No. 6,435,242 where a positive pressure is applied by a bladder system that is secured to the mold via a vacuum seal. Other examples of pressure application systems that utilize combinations of flexible bladders and rigid components include: U.S. Pat. Nos. 6,537,483; 6,746,737; 6,692,681; 6,666,651; 6,596,121; 6,319,346; and German Patent DE 10150659. A closed-mold resin infusion process has also been developed where positive pressure is applied using a rigid closed mold that includes an internal flexible sheet on one surface (See "Investigation of a Two-Stage Injector Process to Reduce The Effects of In-Plane Resin Flow", Larsen et. al., Montana State University, AIAA-2002-0026).

Even though the above systems are well suited for their intended purpose, there is a continuing need to develop new systems that can be used as an alternative to the autoclave for applying pressure and heat, if required, to composite structures during the curing process. This continuing need is especially present with respect to the molding of large composite parts, such as wind energy turbine blades and large aerospace components.

SUMMARY OF THE INVENTION

In accordance with the present invention an apparatus and method are provided for molding composite bodies into composite parts using pressure. The apparatus includes a lower inflexible mold that is combined with an elastic upper mold layer to form a molding chamber in which the composite body to be molded is placed. An elastic pressure layer is located above the upper mold layer. The perimeters of the two elastic layers are sealed together to provide an elastic bladder that functions as a pressure chamber. A flexible expansion control layer is used to limit the increase in surface area of the pressure layer during pressurization. A perimeter retention lock is provided to prevent the perimeters of the elastic and flexible layers from moving inward or away from the lower mold during application of pressure to the pressure chamber.

The pressure chamber is pressurized during molding to force the upper mold layer against the composite body and lower mold. This application of pressure during molding provides the many benefits of pressurized molding mentioned previously. The flexible expansion control layer allows one to pressurize the bladder to relatively high levels without over expanding and bursting the bladder. The apparatus may be used in combination with vacuum resin infusion systems where the composite body is surrounded with a vacuum bag to provide for infusion of resin into the composite. In addition, the apparatus may be heated in a variety of ways during molding when the resin system being used requires curing at elevated temperatures.

The apparatus and methods of the present invention are particularly well suited for use in making large composite parts and provide a relatively simple, efficient and inexpensive alternative to autoclaves and other conventional pressure molding apparatus that are not well suited for use in making such large parts.

The above described and many other features and attendant advantages of the present invention will become better understood by reference to the following detailed description when taken in conjunction with the accompanying drawings.

DETAILED DESCRIPTION OF THE INVENTION

Figure 3:
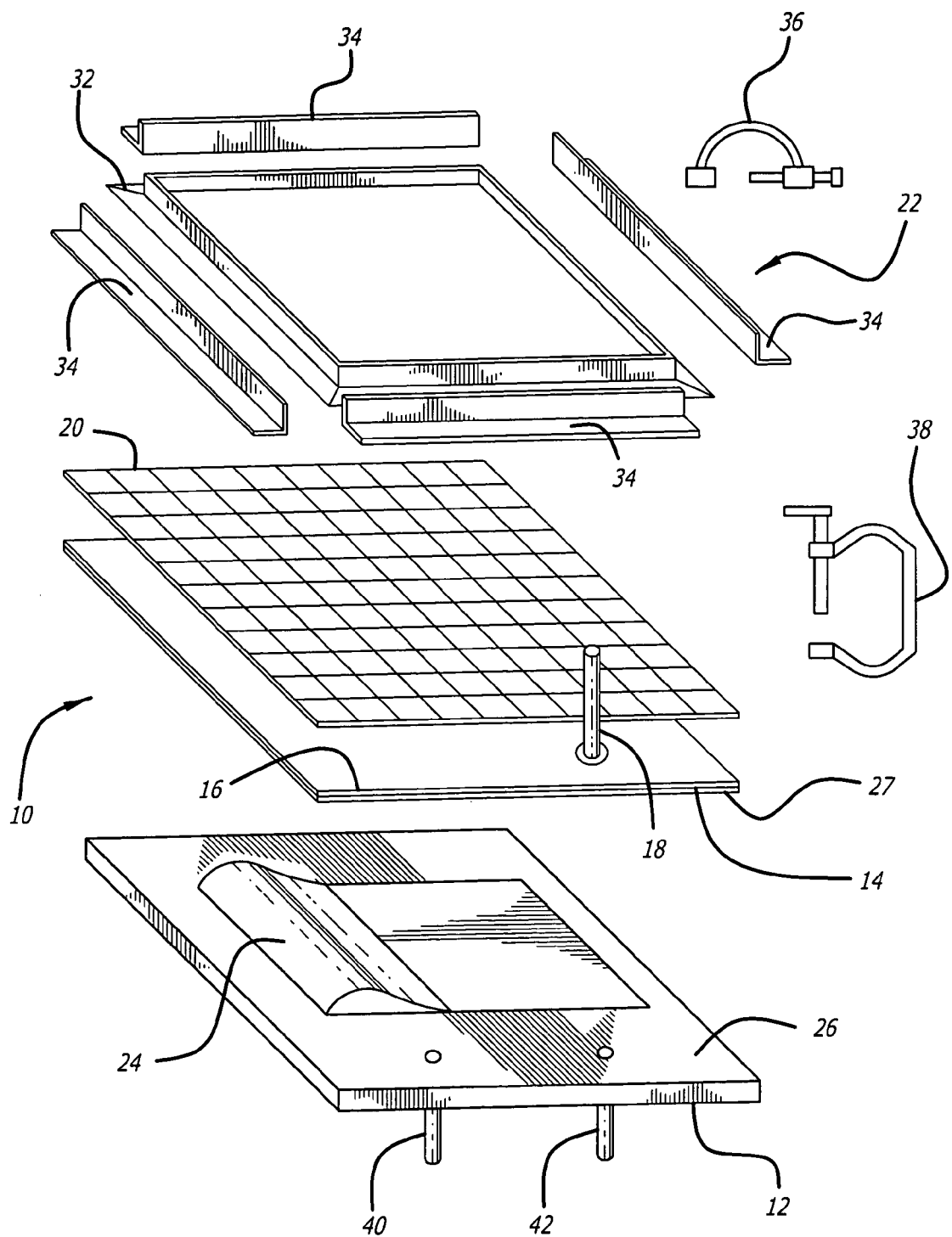
FIG. 3 is a perspective view of an exemplary disassembled apparatus in accordance with the present invention.

A disassembled preferred exemplary apparatus for molding a composite body into a composite part is shown generally at 10 in FIG. 3. The apparatus 10 includes an inflexible lower mold 12, elastic upper mold layer 14, elastic pressure layer 16, pressurization port 18, flexible expansion control layer 20 and a perimeter retention lock system shown generally at 22. The apparatus is designed to apply pressure to a composite body (uncured) to form or mold a composite part (cured). An exemplary composite body is shown at 24. The composite body 24 is made up of a combination of resin and fibers, as is well known. The apparatus 10 may be used to mold any of the resin/fiber combinations that are typically used in making composite parts. The apparatus may be used as a substitute for an autoclave or any of the other convention molding systems used for pressurized molding of composite materials.

The apparatuslo may be used to mold any size composite body. However, it is particularly well suited for use in making large composite parts from large composite bodies. A large composite body is one that has an overall dimension (length+width+thickness) of at least a few feet. More typically, the overall dimension of a large composite body will range from tens of feet up to hundreds of feet and more. Large composite parts are used widely in the aerospace, marine and wind energy turbine industries. An exemplary wind energy turbine blade skin has dimensions of 40 to 60 meters in length, 3 to 10 meters in width and thicknesses ranging from 2 to 30 mm. A typical large marine part is a boat or ship hull, which can have overall dimensions ranging from. tens of feet up to hundreds of feet. Aerospace applications include a wide variety of structural or non-structural parts that can have overall dimensions ranging from a few feet up to hundreds of feet. Examples of large aerospace parts include wing skins, fuselage sections, fuselage frame sections and nose cones. The apparatus 10 is particularly well suited for molding relatively thick composite bodies having thicknesses that range from 0.5 inch to 3 inches and may have from a few to hundreds of plies.

The lower mold 12 is preferably made from an inflexible material such as any of the steel alloys typically used to make autoclaves and pressurized molds. Invar 36 is an example. The lower mold may be made from other materials, such as composite materials, provided that the material is sufficiently rigid to withstand the single sided pressurization force exerted by the tool. See U.S. Pat. No. 4,851,280 for examples of suitable composite materials that have been used as an alternative to steel alloys. The lower mold 12 includes an inflexible mold surface 26 on which the composite body 24 is placed for molding. The lower mold surface 26 may be machined or otherwise shaped to provide a molding contour. The mold surface 26 is shown as being flat in FIG. 3 for simplicity. The dimensions (width and length) of the mold 26 are chosen to match the particular part being made. As mentioned above, it is preferred that the apparatus be used to mold large parts. Accordingly, the mold surface 26 can be quite large and range from a few square feet to hundreds of square feet. The mold 12 may be of any design and material used with typical permanent vacuum bags. Due to the application of high positive pressure, the mold underside should be reinforced. The mold can have a concave or convex profile for lay-up or resin infusion. The mold 12 also includes ports 40 and 42 that may be used as vacuum ports, ports for thermocouples and other sensor leads as well as resin infusion or for circulation of heating fluids or as ports for heating devices. The ports are located in the mold 12 to keep them from interfering with the elastic layers 14 and 16, flexible layer 20 and the perimeter retention lock system 22

Figure 1:
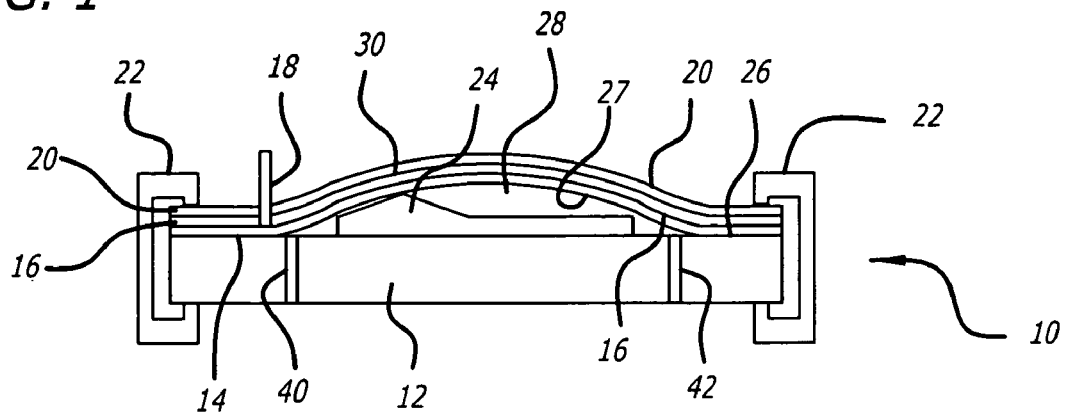
FIG. 1 is a simplified cross-sectional representation of an apparatus in accordance with the present invention for molding a composite part where the apparatus is in a non-pressurized state.
Figure 4:
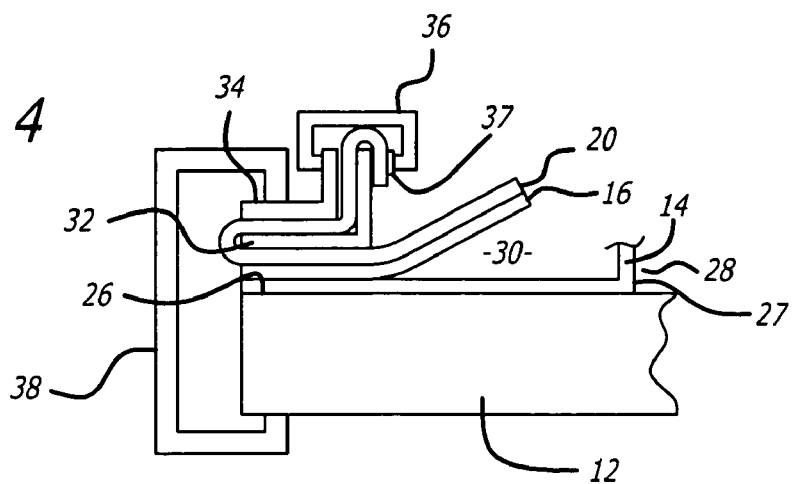
FIG. 4 is a sectional view of a portion of an apparatus in accordance with the present invention that shows an exemplary perimeter retention lock system.

The elastic upper mold layer 14 has a mold surface 27 that covers the lower mold surface 26 to provide a molding cavity 28 in which the composite body 24 is located during molding of the composite body 24 into a composite part. The molding cavity 28 is shown in FIGS. 1 and 4. The elastic upper mold layer is made from a strong, elastic material that is impermeable to gas and/or fluid. Exemplary materials include: rubbers, such as, silicone, neoprene, SBR, butyl and nitrile rubbers; and flexible bagging materials, such as, nylon, polypropylene, polyethylene and polyvinyl. The elastic material should preferably be capable of stretching from 100% to 600% of its original size before failing. The width and length of the elastic upper mold layer 14 in a relaxed state is chosen to match the underlying lower mold 12. The thickness of the elastic upper mold layer 14 is varied depending upon the particular elastic material used and the expected pressure levels in the apparatus. Pressure levels on the order of just above atmospheric to 100 psi and more are possible. Pressures on the order of 30 psi to 60 psi are typically used. In general, the upper mold layer 14 will be from 0.002 inch to 0.25 inch thick. Preferred elastic materials include silicone rubber and high stretch nylon vacuum bag materials.

Figure 2:
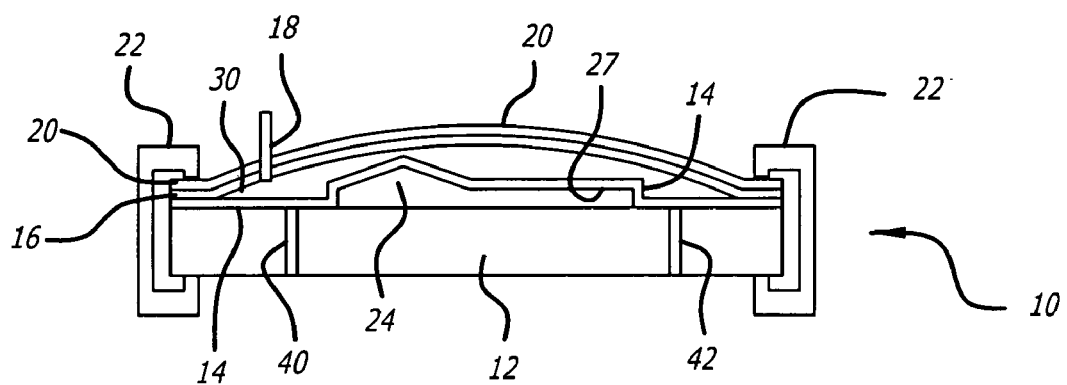
FIG. 2 is a simplified cross-sectional represent of the apparatus shown in FIG. 1 where the apparatus is in a pressurized state.

The two layers 14 and 16 may be made from different materials, but are preferably made from material having the same composition and both layers preferably have the same relaxed dimensions. The perimeters of the two layers at the retention frame 32 must match, so that they can be sealed together to provide a bladder that forms pressure chamber 30, as shown in FIGS. 1, 2 and 4. When the term "perimeter" is used in connection with the two layers 14 and 16, as well as the expansion control layer 20, it is intended to mean the perimeter of the layers as defined by retention frame 32 where the layers are clamped together and not the actual outer edges of the layers themselves. The pressurization port 18 is securely bonded or otherwise attached to pressure layer 16 to provide a route for pressurization of the chamber 30 with gas or liquid fluid.

The flexible expansion control layer 20 is made from materials that are flexible, but relatively non-elastic. The material may or may not be impermeable to gas or liquid fluid. The material must be sufficiently strong to prevent the elastic pressure layer 16 from continuing to expand (i.e. increase in surface area) and bursting as pressure is increased in the pressure chamber 30. The material must be able to retain its strength at elevated molding temperatures if the apparatus is to be heated during the molding operation. Exemplary materials include cotton canvas, denim, fabrics made from nylon fibers, glass fibers, aramid fibers, polyethylene fibers, polyester fibers, graphite fibers and combinations thereof.

The width and length of the flexible fabric layer 20 are chosen to match the underlying elastic upper mold layer 14, elastic pressure layer 16 and mold 12 at the perimeter as defined by the retention frame 32. The thickness is varied depending upon the fabric type used and the expected maximum operating pressure for the apparatus. A reinforced opening is provided in the fabric to allow the pressurization port 18 to pass through. The opening can be reinforced with the same fabric as the rest of the expansion control layer 20 or it can be reinforced using a heavier fabric or fibers or a solid sheet attached to the fabric around the opening. It is only important that the opening be reinforced sufficiently to prevent premature failure of the expansion control layer at the opening. The expansion control layer 20 may be made from solid films or sheets provided that they provide the required expansion control when the apparatus is pressurized. Solid films may not be as easy to shape into desired contours for certain applications. Accordingly, the use of a fabric expansion control layer is preferred.

The perimeter retention lock 22 is composed of various elements that are designed to lock the perimeters of the elastic mold layer 14, elastic pressure layer 16 and flexible expansion control layer 20 to the lower mold 12. Locking of these three layers to the lower mold 12 prevents their perimeters from moving inward or away from the lower mold surface 26 during pressurization of the apparatus. As shown in FIG. 3, an exemplary perimeter retention lock 22 includes a retention frame 32, four retention rails 34, clamp 36 for locking the expansion control layer 20 to the frame 32 and clamp 38 for locking the retention frame 32 and layers 14, 16 and 20 to the lower mold 12. It should be noted that only one set of clamps 36 and 38 are shown in FIG. 3 for simplicity. It will be understood by those of ordinary skill that at least three other sets of clamps 36 and 38 are required to lock the other three sides of the retention frame 32 to the lower mold 12. The number of clamps will vary and depends upon the size of the retention frame 32 as well as the particular materials used and the expected pressurization level. Typically, four or more clamps 36 are used per side to secure the flexible expansion control layer 20 between the retention frame 32 and the retention rail 34. In general, the number of clamps 38 used to secure the retention frame 32 to the mold 12 will be less than the number of clamps 36 that are used to secure the expansion control layer 20.

As shown in FIG. 4, the outer edge of the expansion control layer 20 is located between the retention frame 32 and retention rail 34 and securely clamped in place using clamp 36. The clamp 36 may be clamped directly to the retention frame 32 or, as shown in FIG. 4, the expansion control layer 20 may be overlapped and clamped between the clamp 36 and retention frame 32. It is preferred that the clamp 36 include a clamping surface 37 that has a surface area and shape which provides for secure clamping of the expansion control layer 20 to the retention frame 32 without damaging the layer. The outer edges of the expansion control layer 20, mold layer 14 and pressure layer 16 are located between the retention frame 32 and lower mold surface 26 and securely clamped in place using clamp 38 to form the perimeter of the mold. This particular perimeter retention lock configuration insures that the expansion control layer 20 is secured tightly to the retention frame 32 and that the two elastic layers 14 and 16 and the retention frame 32 are secured to the mold 12. This locking configuration prevents the perimeters of the three layers 14, 16 and 20 from moving inward or away from the lower mold surface 26 during application of pressure to the pressure chamber 30.

It is important that the two elastic layers 14 and 16 be sealed together in a tight fashion around their perimeters to form the pressure chamber 30. Especially when using a liquid fluid, no leakage is preferred, but some leakage is acceptable for gas fluids so long as the pressure source can compensate for the leakage. If desired, the two elastic layers 14 and 16 can be sealed around their perimeters using heat and/or a suitable glue or other sealing agent. Alternatively, the pressure applied by clamp 38 may be sufficient to mechanically seal the layers together to form the pressure chamber 30. It is preferred that a combination of bonding and clamping pressure be used to seal the perimeters of the two elastic layers together while at the same time securing them to the lower mold 12 with clamps 38.

A simplified view of the molding apparatus 10 in a non-pressurized state is shown in FIG. 1. A corresponding view of the molding apparatus 10 in a pressurized state is shown in FIG. 2. These simplified views will be used to describe the operation and use of the molding apparatus 10 to mold a composite body 24 into a composite part. The composite body 24 can be located in a disposable vacuum bag (not shown) and subjected to vacuum infusion of resin in accordance with known resin infusion procedures. A vacuum may also be applied by incorporation of a vacuum tight seal between the lower mold surface 26 and the elastic upper mold layer 14, such as with a permanent or reusable vacuum bag. In the case of a disposable vacuum bag, the seal of the bag must be entirely within or outside of the perimeter retention lock system 22, so as not to crush the vacuum bag seal.

At the beginning of the molding process as shown in FIG. 1, the composite body 24 is located in the molding cavity 28, which is formed between the lower mold 12 and the elastic upper mold 14. The elastic upper mold layer 14 and elastic pressure layer 16 are in a relaxed state so that the volume of the pressure chamber 30 is at a minimum. Pressure is applied to the apparatus by introducing pressurized gas or liquid fluid into the pressure chamber 30 through the pressurization port 18. As shown in FIG. 2, the pressurization of chamber 30 increases the volume of chamber 30 and causes an increase in the surface area of the elastic pressure layer 16. At the same time, the upper mold layer 14 is compressed down against the composite body 24. The flexible expansion control layer 20 prevents the pressure layer 16 from over expanding and bursting. For safety, the amount of expansion allowed by the control layer 20 should be less than 80% of the expansion capability of the pressure layer 16 and preferably less than a 200% increase in surface area. The particular expansion limit will vary depending upon the specific elastic material being used and the amount of pressure applied to the pressure chamber 30. The material for the expansion control layer 20 is chosen to provide the desired limits on pressure layer expansion.

The apparatus 10 is left in the pressurized state (FIG. 2) for a sufficient time to allow the composite body 24 to be consolidated and cured into the composite part. Depending upon the type of composite body being molded, the body may need to be heated during the consolidation and curing process. Heat may be applied using a flexible blanket placed on top of or under the composite body 24. Alternatively, heating rods can be incorporated into the mold 12 or a heating fluid can be circulated through the ports in the mold or through the pressure chamber 30. Heating devices may also be introduced through ports 40 and/or 42.

After molding is complete, the pressure is released from chamber 30 and the elastic and flexible layers are allowed to return to their relaxed state as shown in FIG. 1. If heated, the apparatus is allowed to cool. The perimeter retention lock 22 is then disengaged and the composite part removed.

Having thus described exemplary embodiments of the present invention, it should be noted by those skilled in the art that the within disclosures are exemplary only and that various other alternatives, adaptations and modifications may be made within the scope of the present invention. Accordingly, the present invention is not limited by the above-described embodiments, but is only limited by the following claims.

What is claimed is:

1. A method for molding a composite body into a composite part comprising the steps of:
    placing a composite body onto an inflexible mold surface;
    placing an elastic mold layer over said composite body to form a molding cavity between said inflexible mold surface and said elastic mold layer, said elastic mold layer having a perimeter;
    placing an elastic pressure layer over said elastic mold layer, said elastic pressure layer having a perimeter;
    placing a flexible expansion control layer over said elastic pressure layer, said flexible expansion control layer having a perimeter and a first portion, second portion and third portion wherein said third portion is located closest to said perimeter, said first portion is located furthest away from said perimeter and said second portion is located between said first portion and said third portion;
    providing a retention frame and a retention rail;
    locating said retention frame over said mold surface such that the perimeters of said mold layer, pressure layer and said first portion of said expansion control layer are located between said mold surface and said retention frame;
    locating said retention rail relative to said retention frame such that said second portion and said third portion of said expansion control layer are located between said retention frame and said retention rail;
    clamping said retention rail to said mold surface in order to seal the perimeters of said mold layer and pressure layer together to form a pressure chamber between said mold layer and pressure layer and to clamp said first and second portions of said expansion control layer and said retention frame to said mold surface;
    clamping said retention rail to said retention frame to provide clamping of said third portion of said expansion control layer between said retention frame and said retention rail;
    pressurizing said pressure chamber for a sufficient time to compact said composite body and form said composite part; and
    removing said composite part from said pressure chamber.

2. A method for molding a composite body into a composite part according to claim 1 that includes the additional step of heating said composite body located in said molding cavity.

3. A method for molding a composite body into a composite part according to claims 1 wherein said composite body is a large composite body.

4. A method for molding a composite body into a composite part according to claim 3 wherein said large composite part is selected from the group consisting of wind energy turbine blades, aerospace structures and marine structures.

5. A method for molding a composite body into a composite part according to claim 1 including the step of surrounding said composite body with a vacuum bag.

6. A method for molding a composite body into a composite part according to claim 1 wherein said inflexible mold surface is made from a material selected from the group consisting of steel and composite material.

7. A method for molding a composite body into a composite part according to claim 1 wherein said elastic mold layer is made from an elastic material selected from the group consisting of rubber, nylon, polypropylene, polyethylene and polyvinyl.

8. A method for molding a composite body into a composite part according to claim 1 wherein said elastic pressure layer is made from a material selected from the group consisting of rubber, nylon, polypropylene, polyethylene and polyvinyl.

9. A method for molding a composite body into a composite part according to claim 1 wherein said flexible expansion control layer is a fabric comprising fibers selected from the group consisting of cotton fibers, nylon fibers, glass fibers, aramid fibers, polyester fibers and graphite fibers.

10. A method for molding a composite body into a composite part according to claim 1 wherein said pressure chamber is pressurized to a pressure of between 30 pounds per square inch to 60 pounds per square inch.

11. A method for molding a composite body into a composite part according to claim 1 wherein said expansion control layer includes a fourth portion that is located between the perimeter of said expansion control layer and said third portion and wherein said step of clamping said retention rail to said retention frame comprises the step of clamping said fourth portion of said expansion control layer to said retention frame such that said retention frame is clamped between said third and fourth portions of said expansion control layer.

12. A method for molding a composite body into a composite part according to claim 1 wherein said retention frame includes a first section that is substantially parallel to said mold surface when said retention frame is clamped to said mold surface and a second section that is substantially perpendicular to said mold surface when said retention frame is clamped to said mold surface.

13. A method for molding a composite body into a composite part according to claim 1 wherein said retention rail includes a first section that is substantially parallel to said mold surface when said retention rail is clamped to said mold surface and a second section that is substantially perpendicular to said mold surface when said retention rail is clamped to said mold surface.

14. A method for molding for molding a composite body into a composite part according to claim 12 wherein said retention rail includes a first section that is substantially parallel to said mold surface when said retention rail is clamped to said mold surface and a second section that is substantially perpendicular to said mold surface when said retention rail is clamped to said mold surface.

15. A method for molding for molding a composite body into a composite part according to claim 13 wherein said first section of said retention rail is clamped to said mold surface such that said first section of said retention frame is sandwiched between said first and third portions of said expansion control layer and said mold layer and pressure layer are sandwiched between said expansion control layer and said mold surface.

16. A method for molding for molding a composite body into a composite part according to claim 15 wherein said second section of said retention rail is clamped to said second section of said retention frame such that said third portion of said expansion control layer is sandwiched therebetween.

17. A method for molding a composite body into a composite part according to claim 15 wherein said expansion control layer includes a fourth portion that is located between the perimeter of said expansion control layer and said third portion and wherein said step of clamping the second section of said retention rail to the second section of said retention frame comprises the step of clamping said fourth portion of said expansion control layer to said retention frame such that said retention frame is clamped between said third and fourth portions of said expansion control layer.

* * * * *